US010861423B2

(12) United States Patent
Guan et al.

(10) Patent No.: US 10,861,423 B2
(45) Date of Patent: Dec. 8, 2020

(54) DISPLAY APPARATUS AND DISPLAY METHOD THEREOF

(71) Applicant: BOE TECHNOLOGY GROUP CO., LTD., Beijing (CN)

(72) Inventors: Enhui Guan, Beijing (CN); Shuo Chen, Beijing (CN); Lu Tong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/503,139

(22) Filed: Jul. 3, 2019

(65) Prior Publication Data

US 2020/0013376 A1  Jan. 9, 2020

(30) Foreign Application Priority Data

Jul. 5, 2018 (CN) .......................... 2018 1 0729696

(51) Int. Cl.
| G09G 5/38 | (2006.01) |
| G06F 3/01 | (2006.01) |
| G09G 3/34 | (2006.01) |
| G09G 5/14 | (2006.01) |
| G09G 5/373 | (2006.01) |

(52) U.S. Cl.
CPC ............... *G09G 5/38* (2013.01); *G06F 3/013* (2013.01); *G09G 3/342* (2013.01); *G09G 5/14* (2013.01); *G09G 5/373* (2013.01); *G09G 2320/068* (2013.01); *G09G 2320/0686* (2013.01); *G09G 2354/00* (2013.01)

(58) Field of Classification Search
CPC ......... G06F 3/011; G06F 3/013; G09G 3/342; G09G 5/14; G09G 5/373; G09G 5/38; G09G 2320/068; G09G 2320/0686; G09G 2354/00; H04N 21/4312; H04N 21/44218; H04N 21/4854; H04N 21/4858
See application file for complete search history.

(56) References Cited

U.S. PATENT DOCUMENTS

| 2011/0001763 | A1 | 1/2011 | Murakami | |
| 2012/0060177 | A1* | 3/2012 | Stinson, III | ...... H04N 21/44218 725/12 |
| 2016/0195926 | A1 | 7/2016 | Imoto et al. | |
| 2017/0127011 | A1* | 5/2017 | Okajima | .............. H04N 13/279 |
| 2017/0132488 | A1* | 5/2017 | Asanuma | .................. G06T 5/00 |

(Continued)

FOREIGN PATENT DOCUMENTS

| CN | 101944349 A | 1/2011 |
| CN | 103796056 A | 5/2014 |

(Continued)

OTHER PUBLICATIONS

First Chinese Office Action issued in corresponding Chinese Application No. 201810729696.X, dated Apr. 24, 2020, with English language translation.

*Primary Examiner* — Nelson M Rosario
(74) *Attorney, Agent, or Firm* — McDermott Will & Emery LLP

(57) ABSTRACT

A display method of a display apparatus includes: obtaining at least one set of viewing position parameters; determining a target display area within an active area of the display apparatus according to the at least one set of viewing position parameters; and displaying images in the target display area.

16 Claims, 9 Drawing Sheets

(56) References Cited

U.S. PATENT DOCUMENTS

2018/0357981 A1* 12/2018 Ng ........................... G09G 5/12
2019/0099660 A1*  4/2019 Nelson ................ G07F 17/3246

FOREIGN PATENT DOCUMENTS

| CN | 104020842 A | 9/2014 |
| CN | 104267816 A | 1/2015 |
| CN | 104320714 A | 1/2015 |
| CN | 104461434 A | 3/2015 |
| CN | 104765437 A | 7/2015 |
| CN | 105451093 A | 3/2016 |
| CN | 105518579 A | 4/2016 |
| CN | 106775518 A | 5/2017 |
| CN | 106843821 A | 6/2017 |
| KR | 10-2011-0041066 A | 4/2011 |

* cited by examiner

2

DISPLAY APPARATUS AND DISPLAY METHOD THEREOF

CROSS-REFERENCE TO RELATED APPLICATION

This application claims priority to Chinese Patent Application No. 201810729696.X, filed with the Chinese Patent Office on Jul. 5, 2018, titled "DISPLAY APPARATUS AND DISPLAY METHOD THEREOF", which is incorporated herein by reference in its entirety.

TECHNICAL FIELD

The present disclosure relates to the field of display technologies, and in particular, to a display apparatus and a display method thereof.

BACKGROUND

With a rapid development of display technologies, various types of displays have been gradually developed, for example, liquid crystal displays (LCDs) or organic light-emitting diode displays (OLEDs).

SUMMARY

In an aspect, a display method of a display apparatus is provided. The display method includes: obtaining at least one set of viewing position parameters; determining a target display area in an active area of the display apparatus according to the at least one set of viewing position parameters; and displaying images in the target display area.

In some embodiments, the at least one set of viewing position parameters includes one set of viewing position parameters. The set of viewing position parameters includes: a vertical distance from a viewing position to a plane where the active area is located, and deviation information that the viewing position deviates from a central axis of the active area. The deviation information includes an angle between the central axis and a straight line passing through the viewing position and a center of the active area, and a direction in which the viewing position deviates from the central axis. The central axis is a straight line passing through the center of the active area and is vertical to the plane where the active area is located. Determining the target display area in the active area of the display apparatus according to the at least one set of viewing position parameters includes: determining a size of the target display area according to the vertical distance from the viewing position to the plane where the active area is located, and determining a position of a center of the target display area according to the deviation information that the viewing position deviates from the central axis of the active area.

In some embodiments, the at least one set of viewing position parameters includes a plurality of set of viewing position parameters. Determining the target display area in the active area of the display apparatus according to the at least one set of viewing position parameters includes: calculating a set of average viewing position parameters according to the plurality of sets of viewing position parameters, and determining the target display area according to the set of average viewing position parameters.

In some embodiments, the at least one set of viewing position parameters includes a plurality of sets of viewing position parameters. Determining the target display area in the active area of the display apparatus according to the at least one set of viewing position parameters includes: determining a plurality of target display subareas in one-to-one correspondence with the plurality of sets of viewing position parameters in the active area according to the plurality of sets of viewing position parameters, and determining the target display area according to the plurality of target display subareas.

In some embodiments, the target display area is a minimum graphic area including the plurality of target display subareas, and the minimum graphic area has a preset shape.

In some embodiments, determining the target display area according to the plurality of target display subareas includes: determining a primary set of viewing position parameters in the plurality of sets of viewing position parameters; searching a target display subarea corresponding to the primary set of viewing position parameters as a first target display subarea, and determining a center of the first target display subarea; proportionally enlarging the first target display subarea to include the plurality of target display subareas centering on the center of the first target display subarea, and taking an enlarged first target display subarea as a first undetermined area; proportionally enlarging the first target display subarea to be in contact with a boundary of the active area centering on the center of the first target display subarea, and taking an enlarged first target display subarea as a second undetermined area; and determining whether the first undetermined area extends beyond the second undetermined area; if yes, taking the second undetermined area as the target display area; and if not, taking the first undetermined area as the target display area.

In some embodiments, determining the primary set of viewing position parameters in the plurality of sets of viewing position parameters includes: determining the primary set of viewing position parameters according to received signals transmitted by at least one signal projector, wherein each viewer corresponding to the primary set of viewing position parameters wears a signal projector.

In some embodiments, determining the primary set of viewing position parameters in the plurality of sets of viewing position parameters includes: determining a viewing position having a smallest vertical distance from the plane where the active area is located from viewing positions corresponding to the plurality of sets of viewing position parameters, and taking a set of viewing position parameters corresponding to the determined viewing position as the primary set of viewing position parameters.

In some embodiments, determining the primary set of viewing position parameters in the plurality of sets of viewing position parameters includes: calculating a vertical distance value from each viewing position in viewing positions corresponding to the plurality of sets of viewing position parameters to a central axis of the active area according to the plurality of sets of viewing position parameters; selecting viewing positions, the vertical distance values from which to the central axis of the active area are less than or equal to a preset vertical distance threshold value from the viewing positions corresponding to the plurality of sets of viewing position parameters; and determining a viewing position having a smallest vertical distance from the plane where the active area is located from selected viewing positions and taking a set of viewing position parameters corresponding to the determined viewing position as the primary set of viewing position parameters.

In some embodiments, before obtaining the at least one set of viewing position parameters, the method further includes: obtaining a position of a sight focus of each viewer and determining a deviation value of the position of the sight focus of the viewer relative to a center of the active area; and comparing the deviation value corresponding to the viewer with a set deviation threshold value; and if the deviation value is less than or equal to the set deviation threshold value, obtaining a set of viewing position parameters of the viewer.

In some embodiments, the display apparatus includes a backlight module, and the display method further includes: controlling a portion of the backlight module corresponding to the target display area to emit light.

In some embodiments, the display apparatus includes a backlight module, and the display method further includes: determining a principal image and a background image in an image displayed in the target display area; and controlling a portion of the backlight module corresponding to the principal image to emit light.

In another aspect, a display apparatus is provided. The display apparatus includes a position collector, a processor coupled to the position collector, and a display screen coupled to the processor. The position collector and the processor are configured to obtain at least one set of viewing position parameters. The processor is further configured to determine a target display area within an active area of the display apparatus according to the at least one set of viewing position parameters obtained by the position collector. The display screen is configured to display images in the target display area.

In some embodiments, the position collector includes a camera configured to shoot an effective viewing area to obtain information of the effective viewing area.

In some embodiments, the processor is further configured to obtain a position of a sight focus of at least one viewer according to the information of the effective viewing area, and determine a deviation value of the position of the sight focus of the at least one viewer relative to a center of the active area. The processor is further configured to compare the deviation value corresponding to the at least one viewer with a set deviation threshold value, and obtain a set of viewing position parameters of a corresponding viewer if the deviation value is less than or equal to the set deviation threshold value.

In some embodiments, the position collector includes a position sensor including an infrared transmitter configured to emit infrared light to the effective viewing area, and an infrared receiver configured to receive infrared light reflected back by at least one viewer in an effective viewing area.

In some embodiments, the display apparatus further includes a backlight module disposed on a side of the display screen opposite to a display surface side and a backlight controller coupled to the backlight module and the processor. The backlight module includes a plurality of light-emitting components, and the plurality of the light-emitting components are disposed on a plane parallel to a display surface of the display screen. The backlight controller is configured to control light-emitting components corresponding to at least a portion of the target display area in the plurality of light-emitting components under control of the processor.

In yet another aspect, a non-transitory computer-readable storage medium is provided, which stores executable instructions that, when executed by a display apparatus, cause the display apparatus to perform the display method of the display apparatus according to the above aspect.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in some embodiments of the present disclosure will be described with reference to the accompanying drawings. Obviously, the described embodiments are merely some but not all of embodiments of the present disclosure. All other embodiments made on the basis of the embodiments of the present disclosure by a person of ordinary skill in the art shall be included in the protection scope of the present disclosure.

In the related art, a display apparatus, such as a liquid crystal display apparatus and an organic light-emitting diode display apparatus, may display an image for a user to view. However, the display apparatus in the related art displays an image in an entire active area, and the viewer may be in a better viewing angle only when standing at a specific viewing position, thereby obtaining better viewing effects.

Figure 1:
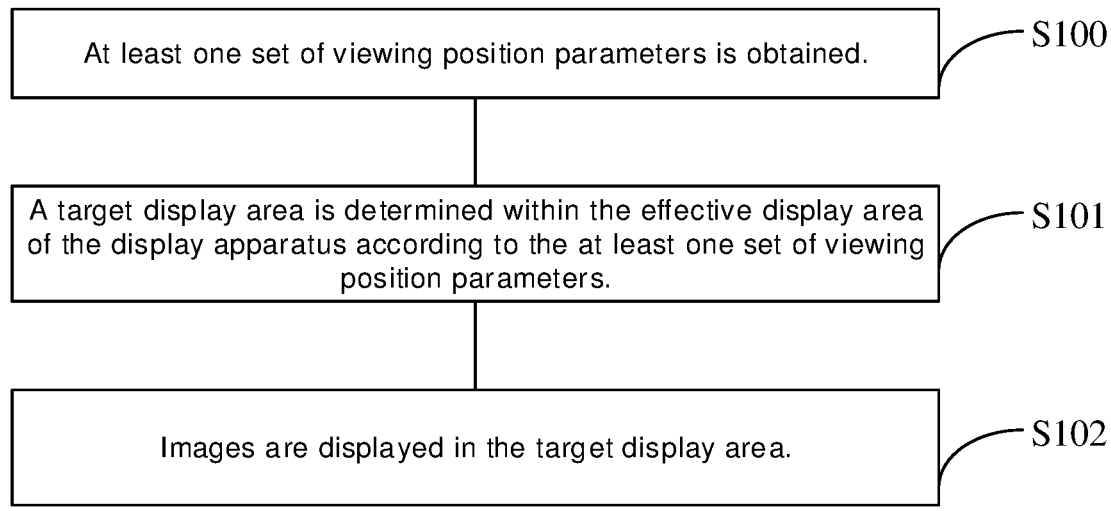
FIG. 1 is a flow diagram of a display method of a display apparatus, according to some embodiments of the present disclosure.

Some embodiments of the present disclosure provide a display method of a display apparatus. As shown in FIG. 1, the display method includes S100 to S102.

In S100, at least one set of viewing position parameters is obtained.

Each set of viewing position parameters corresponds to one viewing position, and there may be one or more viewers in each viewing position. That is, a single viewer corresponds to a set of viewing position parameters, or two or more viewers correspond to a set of viewing position parameters.

Figure 2A:
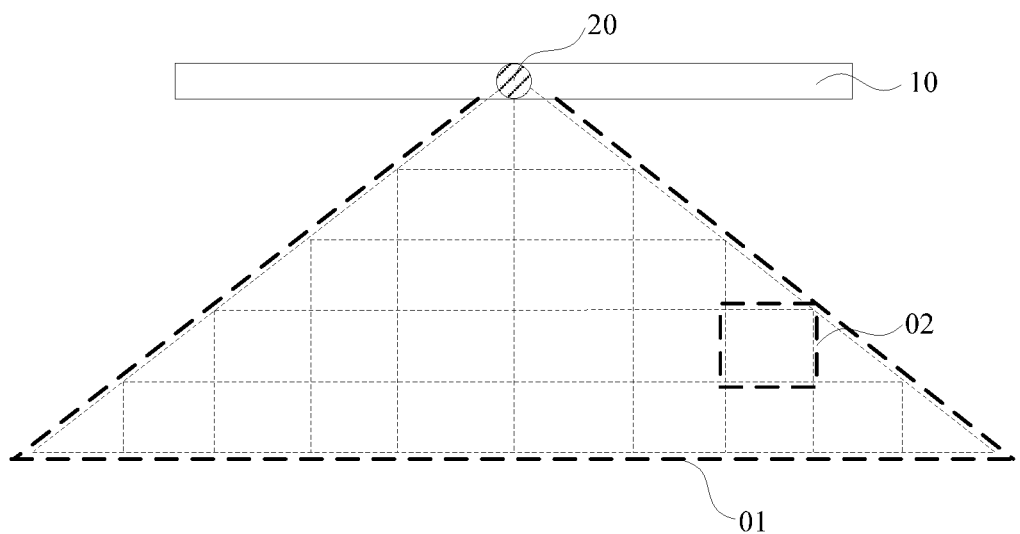
FIG. 2A is a schematic diagram of obtaining a set of viewing position parameters of at least one viewer by using a camera, according to some embodiments of the present disclosure.

In some embodiments, as shown in FIG. 2A, an effective viewing area 01 of the display apparatus 10 is shot by using a camera 20 to obtain an image, and then at least one position of at least one viewer is determined according to the image, thereby obtaining the at least one set of viewing position parameters. In some examples, a position of any part of each viewer's body is selected as the position of the viewer according to the image. For example, a position of an eye of each viewer is selected as the position of the viewer, or a position of each viewer's head is selected as the position of the viewer.

In a case where the position of the eye of each viewer is selected as the position of the viewer, the position of the eye of a single viewer is selected as the viewing position, and then a set of viewing position parameters corresponding to the viewing position 02 is determined. For another example, an area where eyes of two or more viewers are located is selected as the viewing position, and then a set of viewing position parameters corresponding to the viewing position is determined.

Figure 2B:
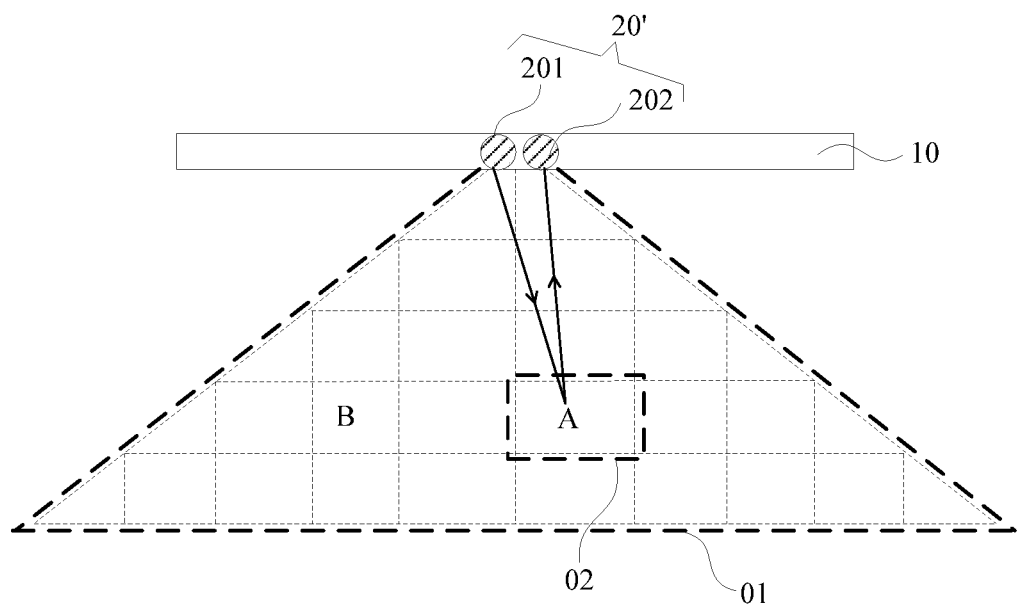
FIG. 2B is a schematic diagram of obtaining a set of viewing position parameters of at least one viewer by using a position sensor, according to some embodiments of the present disclosure.

In some other embodiments, as shown in FIG. 2B, the effective viewing area 01 of the display apparatus 10 is detected by using a position sensor 20'. The position sensor 20' includes an infrared transmitter 201 configured to emit infrared light into the effective viewing area 01, and an infrared receiver 202 configured to receive infrared light reflected back by the at least one viewer in the effective viewing area 01, thereby determining the position of the at least one viewer.

For example, on a display surface side of the display apparatus 10, the effective viewing area 01 is divided into a plurality of viewing sub-areas. Each viewing sub-areas is a viewing position 02. The position sensor 20' may detect whether there is at least one viewer in each viewing sub-area. If there is at least one viewer in a viewing sub-area, the viewing sub-area is taken as the viewing position 02, and then a set of viewing position parameters corresponding to the viewing position 02 is determined.

As shown in FIG. 2B, if one or more viewers are detected in a viewing sub-area A, the viewing sub-area A is taken as the viewing position 02, and then a set of viewing position parameters corresponding to the viewing position 02 is determined. If one or more viewers are detected in a viewing sub-area B, the viewing sub-area B is taken as another viewing position 02, and then a set of viewing position parameters corresponding to the viewing position 02 is determined.

It will be noted that, referring to FIG. 2A and FIG. 2B, the effective viewing area 01 is a largest area in which human eyes can directly view images displayed by the display apparatus 10. A range of the effective viewing area 01 is positively correlated with a range of the active area 03 of the display apparatus 10 (i.e., a largest area of the display apparatus 10 for displaying images), that is, the larger the range of the active area 03, the larger the range of the effective viewing area 01.

In S101, a target display region 04 is determined within the active area 03 of the display apparatus 10 according to the at least one set of viewing position parameters.

Figure 3:
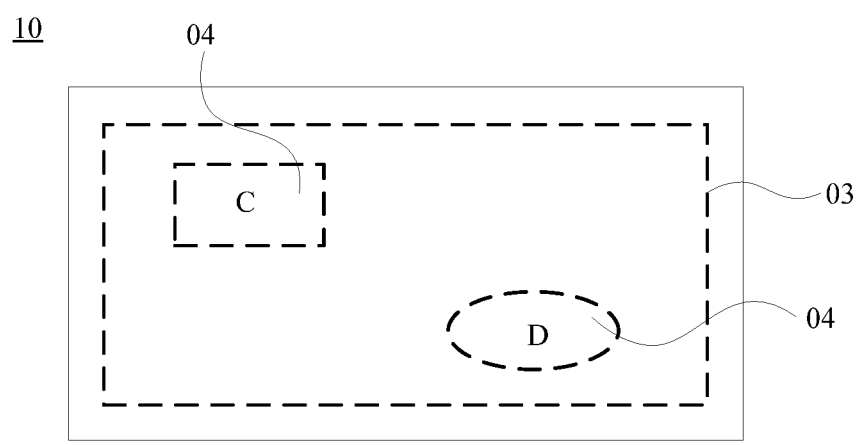
FIG. 3 is a schematic diagram of a display apparatus, according to some embodiments of the present disclosure.

As shown in FIG. 3, for a display apparatus 10, the active area 03 of the display apparatus 10 is certain, and the target display area 04 may vary with a change of the at least one set of viewing position parameters. For example, the target display area 04 includes the area C or the area D in FIG. 3. Here, a shape of each target display area 04 is not limited, and the shape of the target display area 04 may be any shapes, for example, a rectangle, an ellipse, or a circle.

Here, in a case where one set of viewing position parameters is obtained, a target display area 04 may be determined in the active area 03 of the display apparatus 10 according to this set of viewing position parameters. In a case where a plurality of sets of viewing position parameters are obtained, the target display area 04 may be determined in the effective display area 03 of the display apparatus 10 according to all the sets of viewing position parameters, or may be determined according to several sets of viewing position parameters of the plurality of sets of viewing position parameters.

In addition, the target display area 04 is obtained according to at least one set of viewing position parameters of at least one viewer. When the at least one viewer views images displayed in the target display area 04 at a current viewing position, the viewing angle is better, and better viewing effects can be obtained. For a determined viewing position, the target display area 04 may be considered to be a display area in which the viewing effects are better within the active area 03. That is, when an image is displayed in the target display area 04, the at least one viewer may see the image, a position and a size of which are both appropriate, at a corresponding viewing position. In this case, the image displayed in the target display area 04 enables the at least one viewer in the corresponding viewing position to obtain better viewing effects with respect to images displayed in other display areas.

There is no limitation on how to determine the target display area 04 within the active area 03 of the display apparatus 10 according to the at least one set of viewing position parameters, as long as the target display area 04 may be determined according to the at least one set of viewing position parameters, and the at least one viewer may obtain better viewing effects when the at least one viewer views the images displayed in the target display area 04 at a position corresponding to a corresponding set of viewing position parameters.

In some embodiments, each set of viewing position parameters includes a vertical distance from a viewing position to a plane where the active area 03 is located, and deviation information that the viewing position deviates from a center axis of the active area 03. Here, the viewing position is regarded as a point for calculation. For example, when there is a single viewer in the viewing position, a position of a midpoint of a line between the viewer's eyes is taken as a position of the above point. When there are a plurality of viewers in the viewing position, a center of the viewing position is taken as the position of the above point.

Based on this, there are a plurality of methods of implementing S101, including but not limited to methods in a plurality of embodiments shown below.

In some embodiments, the at least one set of viewing position parameters includes a single set of viewing position parameters. In this case, S101 includes S1 and S2.

In S1, a size of a target display area is determined according to a vertical distance from a viewing position to the plane where the active area is located.

Figure 4:
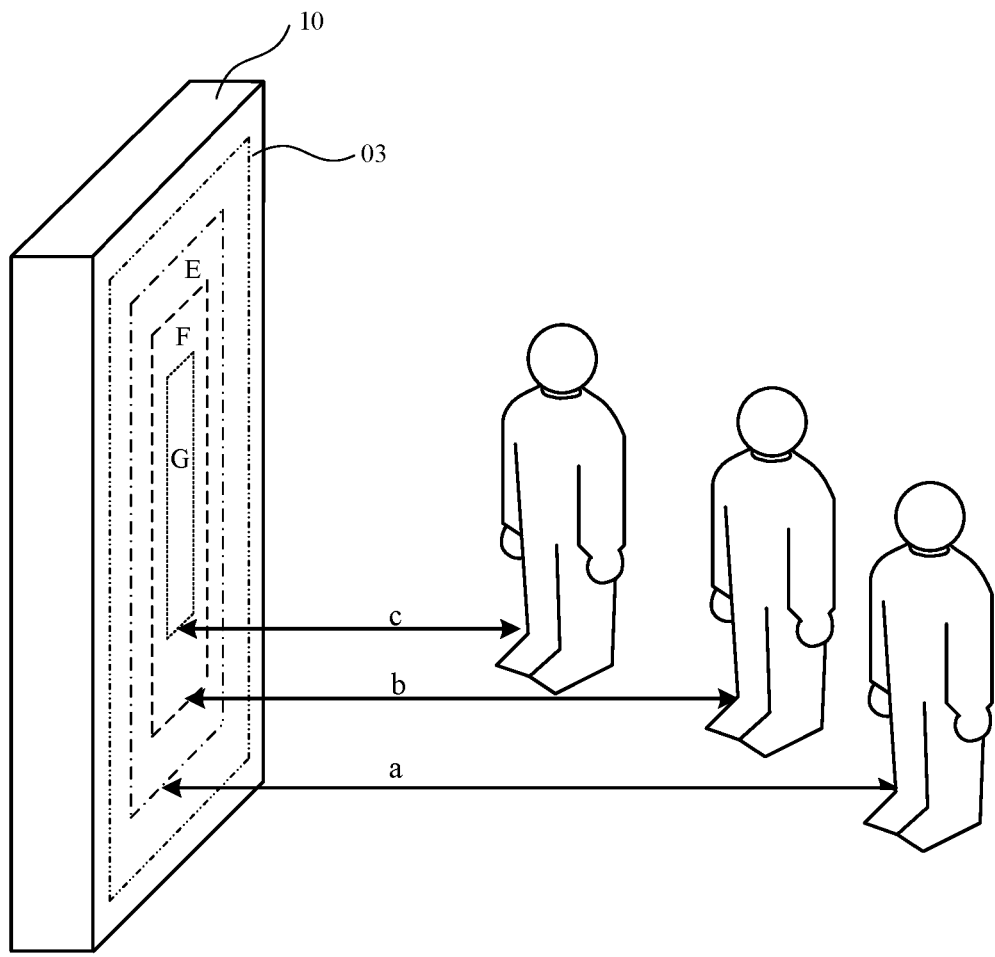
FIG. 4 is a schematic diagram showing a corresponding relationship between a vertical distance from a viewer to a plane where an active area is located and a size of a target display area, according to some embodiments of the present disclosure.

Referring to FIG. 4, the display apparatus 10 having various sizes each has a corresponding optimal viewing distance. Here, a size of a frame of the display apparatus 10 may be ignored, and the size of the display apparatus 10 may be considered to be a size of the active area 03 of the display apparatus 10.

The optimal viewing distance may be in a range of distance. The viewer may clearly view the images displayed by the display apparatus 10 and may see images displayed in the entire active area 03 of the display apparatus 10 in the range of distance (i.e., the optimal viewing distance). If a distance is greater than an upper limit of the range of distance, the viewer may not be able to clearly see the images displayed by the display apparatus 10. If a distance is less than a lower limit of the range of distance, the viewer may not be able to see the images displayed in the entire active area 03 of the display apparatus 10, and may only see images displayed in a portion of the active area 03.

The optimal viewing distance is positively correlated with the size of the display apparatus 10. Taking an example in which the display apparatus 10 is a television, according to standards of a television industry, optimal viewing distances of televisions having sizes of 32 inches and below are 2 m or less, an optimal viewing distance of a 40-inch television is in a range of 2 m to 2.5 m, an optimal viewing distance of a 50-inch television is in a range of 2.5 m to 3 m, an optimal viewing distance of a 55-inch television is in a range of 3 m to 3.5 m, and optimal viewing distances of televisions having sizes of 65 inches and above are 3.5 m or more.

As will be seen from the above, there is a corresponding relationship between the optimal viewing distance and the size of the display apparatus 10, that is, there is a corresponding relationship between the optimal viewing distance and the size of the active area of the display apparatus 10. It will be seen that, in order to achieve a better viewing angle, a size of an area of the display apparatus in which an image is displayed may be adjusted according to a vertical distance from the current viewing position to the plane where the active area is located, so that the vertical distance from the current viewing position to the plane where the active area is located becomes the optimal viewing distance relative to a currently displayed image. Therefore, on a premise of ensuring a better viewing angle, there is a corresponding relationship between the vertical distance from the viewing position to the plane where the active area 03 is located and the size of the area of the display apparatus in which an image is displayed (i.e., the size of the target display area 04).

For example, as shown in FIG. 4, the vertical distance from the viewing position to the plane where the active area 03 is located is a, and the target display area 04 is the area E. The vertical distance from the viewing position to the plane where the active area 03 is located is b, and the target display area 04 is the area F. The vertical distance from the viewing position to the plane where the active area 03 is located is c, and the target display area 04 is the area G. Therefore, it will be seen that the vertical distance from the viewing position to the plane where the active area 03 is located is positively correlated with the size of the target display area 04.

Based on the above description, a corresponding relationship between the vertical distance from the viewing position to the plane where the active area 03 is located and the size of the target display area 04 may be preset and stored in the display apparatus 10. Thus, referring to the corresponding relationship, the size of the target display area 04 may be determined according to the vertical distance from the viewing position to the plane where the active area 03 is located.

It will be noted that when the active area 03 is the target display area 04, an optimal viewing distance corresponding to the size of the target display area 04 is a maximum viewing distance of the display apparatus 10. When a vertical distance from an actual viewing position of the viewer to the plane where the active area 03 is located is greater than the maximum viewing distance, images are still displayed in the active area 03.

In S2, a position of a center of the target display area 04 is determined according to deviation information that the viewing position deviates from the central axis of the active area 03.

The deviation information includes an angle between the central axis and a straight line passing through the viewing position and a center of the active area, and a direction in which the viewing position deviates from the central axis. The above central axis is a straight line passing through the center of the active area and vertical to the plane where the active area is located.

When the position of the center of the target display area 04 is certain, a position of the target display area 04 is determined. Since the viewing angle is better when the human eyes are directly facing a center of the display apparatus 10, the position of the center of the target display area 04 may be determined according to the viewing position. That is, the position of the center of the target display area 04 may be determined according to the deviation information that the viewing position deviates from the center of the active area 03 of the display apparatus 10.

Figure 5:
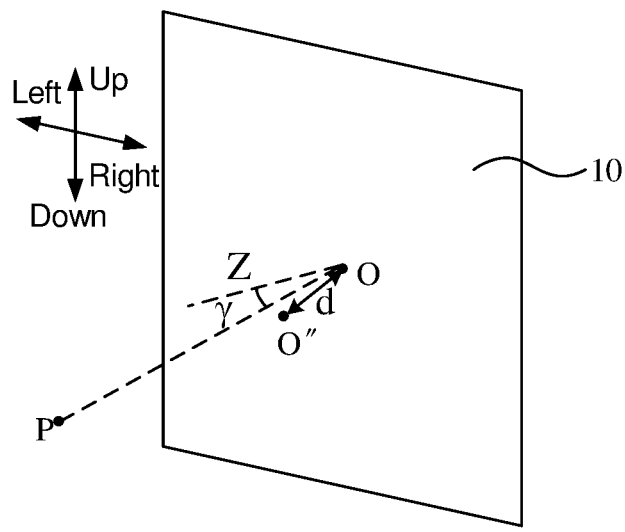
FIG. 5 is a schematic diagram showing a corresponding relationship between an angle by which a viewing position of a viewer deviates from a center of an active area of a display apparatus and a change of a center of a target display area, according to some embodiments of the present disclosure.

For example, as shown in FIG. 5, the center of the active area of the display apparatus 10 is O. When the viewing position is at a position P, the viewing position deviates to a lower left by γ degrees relative to the center point O of the active area. That is, an angle between the central axis Z and a straight line passing through the viewing position P and the center O of the active area is γ degrees, and the viewing position deviates to the lower left relative to the central axis Z. Therefore, the center of the target display area 04 is moved to the lower left by d cm, and the center of the target display area 04 is O".

Figure 6:
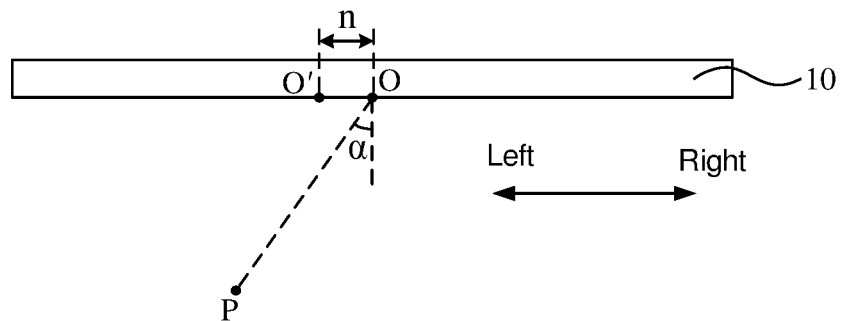
FIG. 6 is a schematic diagram showing another corresponding relationship between an angle by which a viewing position of a viewer deviates from a center of an active area of a display apparatus and a change of a center of a target display area, according to some embodiments of the present disclosure.
Figure 7:
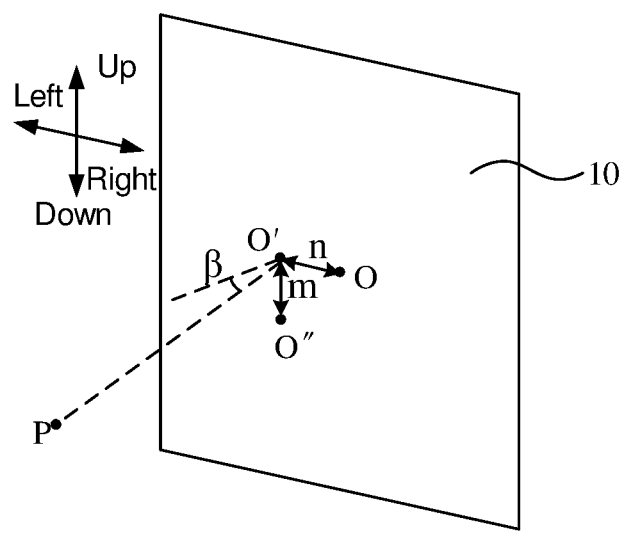
FIG. 7 is a schematic diagram showing a yet another corresponding relationship between an angle by which a viewing position of a viewer deviates from a center of an active area of a display apparatus and a change of a center of a target display area, according to some embodiments of the present disclosure.

For another example, referring to FIGS. 6 and 7, it is determined that the center of the target display area 04 is moved to the left by n cm according to deviation information that the viewing position P deviates to the left by α degrees, and a center point O' is obtained. Then, It is determined that the center of the target display area 04 is also moved downward by m cm according to deviation information that the viewing position P deviates downward by β degrees, and the center O″ of the target display area is obtained.

Based on this, after the at least one set of viewing position parameters is obtained, according to the angle between the central axis and the straight line passing through the viewing position and the center of the active area, the direction in which the viewing position deviates from the central axis, and a relationship between the angle and a moving distance, the position of the center of the target display area 04 may be obtained.

During a process of determining the position of the center of the target display area 04, an angle by which the viewing position deviates upward or downward from the center of the active area 03 may be calculated first, or an angle by which the viewing position deviates to the left or right from the center of the active area 03 of the display apparatus 10 may be calculated first, which is not limited here.

Further, the relationship between the moving distance L and the angle θ between the central axis and the straight line passing through the viewing position and the center of the active area may be set as needed. In some embodiments, L is positively correlated with θ, i.e., L increases as θ increases. For example, L is a product of k and θ (L=k·θ), wherein k is an error coefficient to avoid that a determined center of the target display area exceeds the active area. For example, k may be set equal to 0.5. When the viewing position deviates by 10 degrees to the left, the moving distance L (moving to the left) of the center of the target display area relative to the center of the active area is equal to 5 cm.

After the size of the target display area 04 and the position of the center of the target display area 04 are obtained based on the above S1 and S2, the target display area 04 may be obtained.

In S102, images are displayed in the target display area 04.

Here, the description that images are displayed in the target display area 04 refers to that the images are only displayed in the target display area 04, and are not displayed in other areas other than the target display area 04 in the active area 03.

The position and size of the target display area 04 determine a size and a position of a displayed image. Therefore, the at least one viewer may be in a better viewing angle and obtain better viewing effects.

In the display method of the display apparatus provided by the above embodiments of the present disclosure, the target display area 04 (i.e., an optimal display area) is determined within the active area 03 of the display apparatus 10 according to the at least one set of viewing position parameters, and the images are displayed in the target display area 04. Therefore, the at least one viewer is in a better viewing angle when viewing the images displayed in the target display area 04 at the viewing position corresponding to the at least one set of viewing position parameters, and thus the at least one viewer may obtain better viewing effects.

In addition, the size and position of the target display area 04 (i.e., the displayed image) may correspondingly vary with the change of the at least one set of viewing position parameters, and thus the at least one viewer may be in a better viewing angle at any position of the effective viewing area 01 of the display apparatus 10, and obtain better viewing effects, thereby improving experiences of users.

In some possible applications, the display apparatus 10 is a medical display apparatus used in an operating room. A display method of the medical display apparatus adopts the display method of the display apparatus provided by the present disclosure. The target display area 04 may be determined according to a relative position (i.e., a set of viewing position parameters) of a doctor relative to the display apparatus, and images may be displayed in the target display area 04, thereby providing an optimal viewing angle for the doctor, making the doctor to obtain better viewing effects and helping the doctor perform an operation better.

In some other embodiments, the at least one set of viewing position parameters includes a plurality of sets of viewing position parameters. The plurality of sets of viewing position parameters refer to two or more sets of viewing position parameters. In this case, S101 includes S200 and S201.

In S200, a plurality of target display subareas 05 in one-to-one correspondence with the plurality of sets of viewing position parameters are determined in the active area 03.

It will be noted that, there is no limitation on how to determine a target display subarea 05 in the active area 03 of the display apparatus 10 according to a corresponding set of viewing position parameters.

Figure 8:
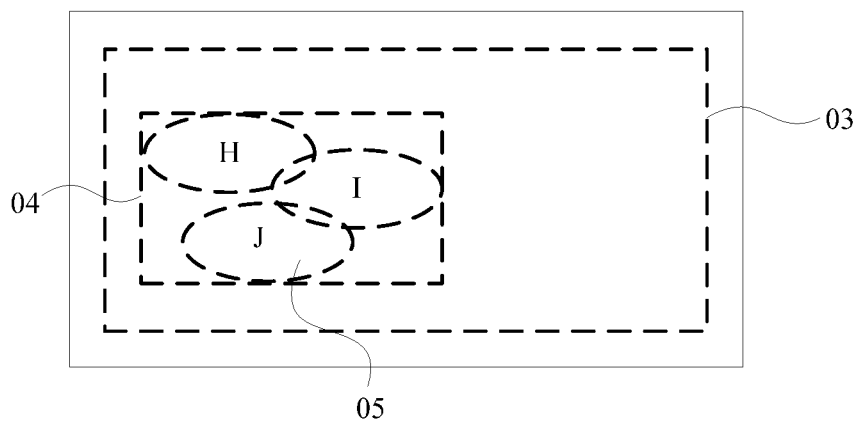
FIG. 8 is a schematic diagram of a method of obtaining a target display area in accordance with a plurality of target display subareas, according to some embodiments of the present disclosure.
Figure 9A:
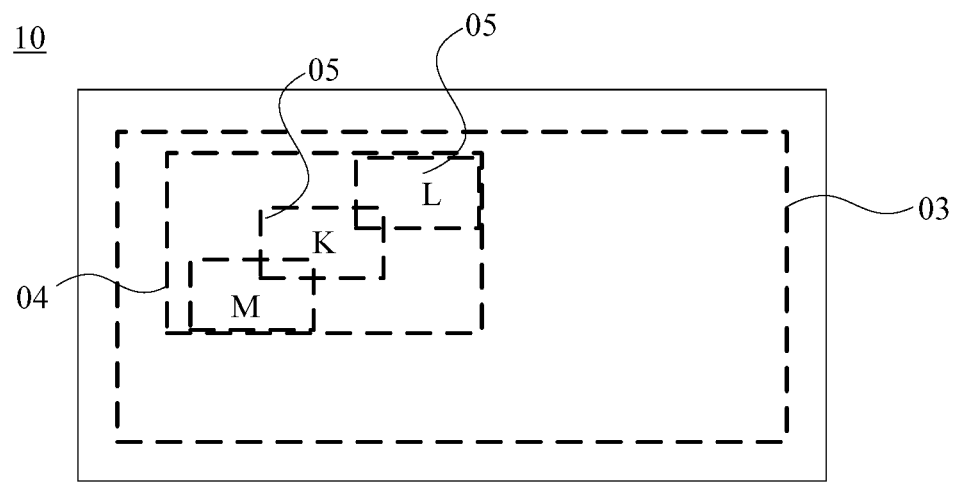
FIG. 9A is a schematic diagram of another method of obtaining a target display area in accordance with a plurality of target display subareas, according to some embodiments of the present disclosure.
Figure 9B:
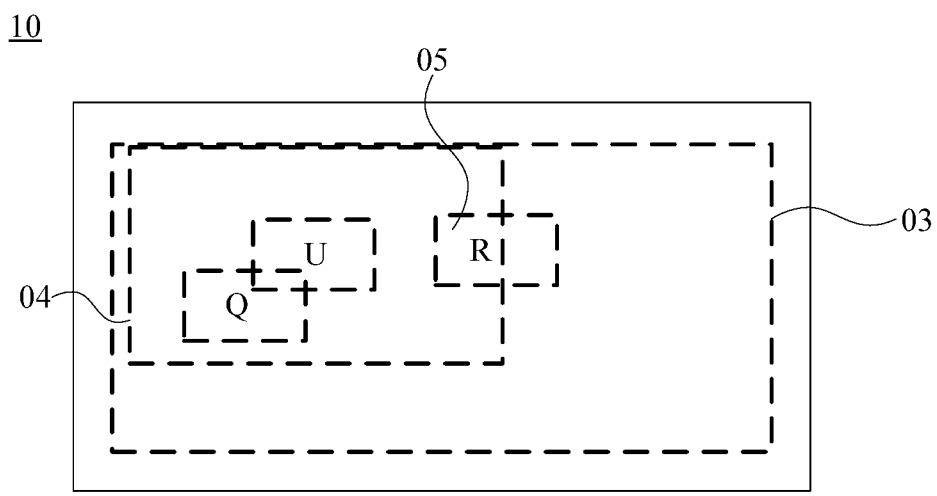
FIG. 9B is a schematic diagram of yet another method of obtaining a target display area in accordance with a plurality of target display subareas, according to some embodiments of the present disclosure.

For example, referring to FIGS. 8, 9A and 9B, a size of each target display subarea 05 is determined according to the vertical distance from a corresponding viewing position to the plane where the active area 03 is located included in a corresponding set of viewing position parameters. In addition, a position of a center of the target display subarea 05 is determined according to the deviation information that the viewing position deviates from the central axis of the active area 03 included in the corresponding set of viewing position parameters. Based on the above steps, the target display subarea 05 is determined. It will be understood that a method of determining the target display subarea 05 in the examples is the same as a method of determining the target display area 04 when the at least one set of viewing position parameters includes one set of viewing position parameters, and details are not described here again.

In a case where the at least one set of viewing position parameters includes the plurality of sets of viewing position parameters, a plurality of viewers corresponding to the plurality of sets of viewing position parameters collectively view one display apparatus 10. Each set of viewing position parameters corresponds to one or more viewers. Since the plurality of sets of viewing position parameters are different, the target display subareas 05 corresponding to the plurality of sets of viewing position parameters are different.

For example, as shown in FIG. 8, a target display subarea 05 determined according to a set of viewing position parameters 1 is H, a target display subarea 05 determined according to a set of viewing position parameters 2 is I, and a target display subarea 05 determined according to a set of viewing position parameters 3 is J. Here, since each set of viewing position parameters corresponds to one target display subarea 05, the number of sets of viewing position parameters is the same as the number of target display subareas 05.

In S201, the target display area 04 is determined according to the plurality of target display subareas 05.

There are a plurality of implementation methods of determining the target display area 04 according to the plurality of target display subareas 05, including but not limited to implementation methods in the following embodiments.

In some embodiments, as shown in FIG. 8, the target display area 04 is a minimum graphic area including the plurality of target display subareas 05. The minimum graphic area has a preset shape, such as a rectangle, a circle, an ellipse or a heart shape.

For example, the shape of the active area 03 is a rectangle, and the preset shape of the minimum graphic area is also a rectangle. Two sets of opposite sides of the minimum graphic area may or may not be parallel to two sets of opposite sides of the active area 03 respectively. As shown in FIG. 8, the two sets of opposite sides of the minimum graphic area are respectively parallel to the two sets of opposite sides of the active area 03.

Here, since the target display area 04 includes the plurality of target display subareas 05, the plurality of viewers corresponding to the plurality of sets of viewing position parameters are in better viewing angles when the images are displayed in the target display area 04, and thus the plurality of viewers may obtain better viewing effects.

In some other embodiments, S201 includes S300 to S303.

In S300, a primary set of viewing position parameters in the plurality of sets of viewing position parameters is determined.

The plurality of sets of viewing position parameters include the primary set of viewing position parameters and a secondary set of viewing position parameters. There are a plurality of methods of determining the primary set of viewing position parameters in the plurality of sets of viewing position parameters, including but not limited to methods in embodiments described below.

In some embodiments, the primary set of viewing position parameters is determined according to received signals transmitted by a signal transmitter. At least one viewer corresponding to the primary set of viewing position parameters wears the signal transmitter. In one or more possible designs, the signal transmitter is an infrared transmitter. When infrared light emitted by one or all of the at least one infrared transmitter is received, a set of viewing position parameters corresponding to the at least one viewer is considered to be the primary set of viewing position parameters, and other sets of viewing position parameters each are considered to be the secondary set of viewing position parameters. With this design, whether a set of viewing position parameters corresponding to the at least one viewer is the primary set of viewing position parameters is determined by the viewer, so that the at least one viewer who wants to obtain a better viewing angle may be in a better viewing angle, and obtain better viewing effects, and thus a practicality is higher.

In some other embodiments, a viewing position having a smallest vertical distance to the plane where the active area is located is determined from the viewing positions corresponding to the plurality of sets of viewing position parameters. A set of viewing position parameters corresponding to the determined viewing position is taken as the primary set of viewing position parameters. With this design, the primary set of viewing position parameters may be quickly determined. Moreover, since a viewing position corresponding to the primary set of viewing position parameters is the viewing position having the smallest vertical distance from the plane where the active area is located, the viewer in the viewing position is likely to be the viewer who wants to obtain a better viewing angle. Making the viewer in a better viewing angle and obtain better viewing effects is advantageous for improving satisfaction of the viewer, thereby enhancing a competitiveness of the product.

In some other embodiments, firstly, a vertical distance value from each viewing position to the central axis of the active area in the viewing positions corresponding to the plurality of sets of viewing position parameters is calculated according to the plurality of sets of viewing position parameters. Secondly, viewing positions, the vertical distance values from which to the central axis of the active area are less than or equal to a preset threshold value, are selected from the viewing positions corresponding to the plurality of sets of viewing position parameters. Finally, the viewing position having the smallest vertical distance to the plane where the active area is located is determined from selected viewing positions. The set of viewing position parameters corresponding to the determined viewing position is taken as the primary set of viewing position parameters. Such a design makes the viewing position corresponding to a determined primary set of viewing position parameters be a viewing position close to the central axis of the active area and the plane where the active area is located. Determining the target display area according to the primary set of viewing position parameters is beneficial to make the viewers in more viewing positions be in a better viewing angle and obtain better viewing effects.

It will be noted that, in some possible implementation manners, the preset vertical distance threshold value may be adjusted according to actual conditions. For example, when the vertical distance value from each viewing position to the central axis of the active area is greater than the preset vertical distance threshold value, the preset vertical distance threshold value may be increased to select at least one viewing position from the viewing positions corresponding to the plurality of sets of viewing position parameters. In addition, if several viewing positions are selected, and the number of viewing positions having the smallest vertical distance from the plane where the active area is located is determined to be two or more from the several viewing positions selected, a set of viewing position parameters corresponding to any viewing position of the two or more viewing positions is selected as the primary set of viewing position parameters.

In S301, a target display subarea corresponding to the primary set of viewing position parameters is determined as a first target display subarea, and a center of the first target display subarea is determined.

Here, a shape of the first target display subarea is not limited, and the shape of the first target display subarea may be any shape, for example, a rectangle, an ellipse, or a circle.

In S302, the first target display subarea is proportionally enlarged to include the plurality of target display subareas 05 centering on the center of the first target display subarea, as shown in FIG. 9A, and the enlarged first target display subarea is taken as a first undetermined area. The first target display subarea is proportionally enlarged to be in contact with a boundary of the active area 03 centering on the center of the first target display subarea, as shown in FIG. 9B, and an enlarged first sub-target display area is taken as a second undetermined area.

A proportional enlargement means a simultaneous enlargement by a same multiple in two directions vertical to each other (for example, a length direction and a width direction). For example, before the proportional enlargement, a ratio of a size of the first target display subarea in the length direction to a size of the first target display subarea in the width direction is 3:4. After the proportional enlargement, it is still satisfied that the ratio of the size of the first target display subarea in the length direction to the size of the first target display subarea in the width direction is 3:4.

For example, when the shape of the first target display subarea is a rectangle, a proportional enlargement of the first target display subarea refers to a proportional enlargement of a length and a width of the rectangle. Similarly, when the shape of the first target display subarea is an ellipse, the proportional enlargement of the first target display area refers to a proportional enlargement of a long axis and a short axis of the rectangle.

In S303, it is determined whether the first undetermined area extends beyond the second undetermined area. As shown in FIG. 9A, if the first undetermined area does not extend beyond the second undetermined area, the first undetermined area is taken as the target display area 04. As shown in FIG. 9B, if the first undetermined area extends beyond the second undetermined area, the second undetermined area is taken as the target display area 04.

As shown in FIG. 9A, a target display subarea K is a target display subarea 05 determined according to the primary set of viewing position parameters, i.e., the first target display subarea. Target display subareas L and M are target display subareas 05 determined according to the secondary set of viewing position parameters. As shown in FIG. 9B, a target display subarea U is the first target display subarea. Target display subareas Q and R are target display subareas 05 determined according to the secondary set of viewing position parameters.

Here, the target display area 04 is obtained by proportionally enlarging the first target display subarea. Therefore, the shape of the target display area 04 is the same as the shape of the first target display subarea, and the size of the target display area 04 is different from a size of the first target display subarea.

In a case where the first target display subarea is proportionally enlarged centering on the center of the first target display subarea, as shown in FIG. 9A, if the first undetermined area does not extend beyond the second undetermined area, the target display area 04 is the area obtained by proportionally enlarge the first target display subarea K centering on the center of the first target display subarea K. The target display area 04 exactly includes the plurality of target display subareas 05, and in this case, the target display area 04 is a minimum area including the plurality of target display subareas 05.

For another example, as shown in FIG. 9B, if the first undetermined area extends beyond the second undetermined area, the target display area 04 is an area obtained by proportionally enlarge the first target display subarea U centering on the center of the first target display subarea U to be in contact with the boundary of the active area 03 and stopping the enlargement. In this case, since the plurality of target display subareas are relatively scattered, after the first target display subarea U is enlarged, the obtained target display area 04 has been in contact with the boundary of the active area 03 without including all the target display subareas. Here, when the first target display subarea is enlarged, the enlargement is stopped as soon as the first target display subarea is in contact with the boundary of the active area 03, and the enlarged target display subarea 05 is regarded as the target display area 04.

Figure 10:
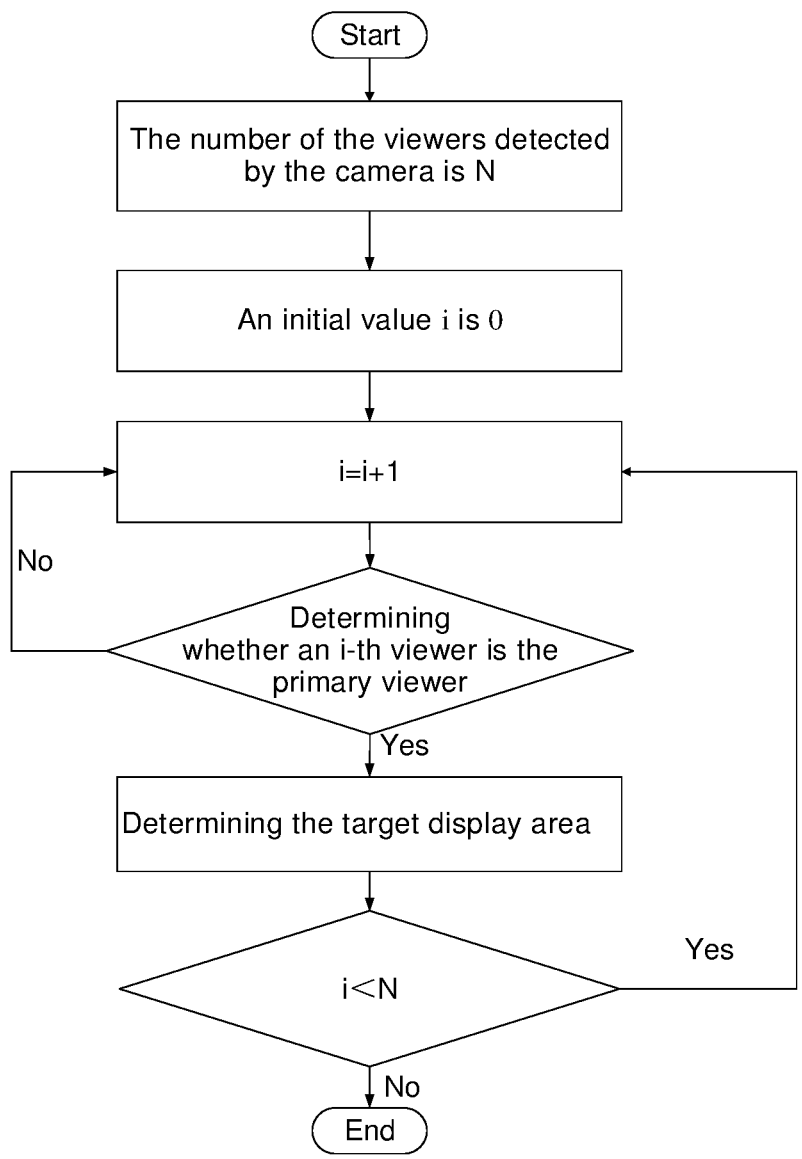
FIG. 10 is a flow diagram of another display method of a display apparatus, according to some embodiments of the present disclosure.

In some embodiments, the plurality of viewers include at least one primary viewer and at least one secondary viewer. As shown in FIG. 10, a method of determining the at least one primary viewer includes: acquiring the plurality of set of viewing position parameters of the plurality of viewers. In this process, a camera is used to capture an image of the plurality of viewers. In this case, a single viewer corresponds to a single set of viewing position parameters, and the at least one primary viewer corresponds to at least one primary set of viewing position parameters.

Here, it will be noted that, in a process of detecting the number N of the viewers by using the camera, since the set of viewing position parameters of each viewer may be obtained, the target display subarea 05 corresponding to each set of viewing position parameters may also be obtained.

After the display apparatus 10 starts to work, the number of the viewers detected by using the camera is N. The number i of the viewers set in the display apparatus 10 is a variable, which takes values from one to N in order, and an initial value of i is zero.

When a first viewer is detected, the number i of the viewer is a sum of zero and one, that is, the number i of the viewer is one. It is determined whether the first viewer is the primary viewer, and if it is determined that the first viewer is not the primary viewer, a second viewer is directly detected. The number i of the viewers in this case is a sum of one and one, that is, the number i of the viewers is two. Then it is determined whether the second viewer is the primary viewer, and if it is determined that the second viewer is not the primary viewer, a third viewer is directly detected. The number i of the viewers in this case is a sum of two and one, that is, the number i of the viewers is three. Then it is determined whether the third viewer is the primary viewer.

The above process is repeated until it is determined that a detected viewer is the primary viewer, and then it is determined whether the number i of the viewers in this case is less than N. If the number i is not less than N, the display apparatus 10 stops working. If the number i is less than N, a next viewer is continuously detected, and it is determined whether the next viewer detected is the primary viewer.

Here, when there are a plurality of primary viewers, any set of viewing position parameters of a plurality of sets of viewing position parameters corresponding to the primary viewers is selected as the primary set of viewing position parameters, and the target display area 04 may be obtained according to the first target display subarea determined according to the primary set of viewing position parameters.

In the case where the target display area 04 is obtained according to the plurality of target display subareas 05, since the target display area 04 is obtained by proportionally enlarge the target display subarea 05 determined according to the primary set of viewing position parameters of the primary viewer centering on the center of the target display subarea 05, the center of the target display area 04 coincides with the center of the target display subarea 05 determined according to the primary set of viewing position parameters of the primary viewer. Thus, when the primary viewer views the images displayed in the target display area 04, the viewing angle of the primary viewer is better, so that the primary viewer may obtain better viewing effects.

In practical applications, such as in an endoscopic operation, the doctors need to use the display apparatus to help complete the operation. In addition to a surgeon, there may also be a plurality of persons involved in the operation such as a deputy of the surgeon and an assistant, to complete the operation together. In this case, the surgeon can be regarded as the primary viewer. Firstly, a target display subarea corresponding to a position of the surgeon, i.e., the first target display subarea, is obtained according to the position of the surgeon. Then, a second target display subarea corresponding to a position of the deputy of the surgeon is obtained according to the position of the deputy of the surgeon, and a third target display subarea corresponding to a position of the assistant is obtained according to the position of the assistant. Finally, the target display area 04 is determined according to the first target display subarea, the second target display subarea, and the third target display subarea. When images are displayed in the target display area 04, the viewing angles of the surgeon, the deputy of the surgeon, and the assistant are better, and the surgeon may obtain better viewing effects than the deputy and the assistant.

When the operation is less difficult, the operation may be completed by a single doctor. In this case, the surgeon needs a best viewing angle. In this case, a set of viewing position parameters of the surgeon may only be obtained, and the target display area 04 is obtained according to the set of viewing position parameters of the surgeon.

When the operation is difficult, sometimes at least two doctors are needed to complete the operation together. In this case, when the target display area is determined, viewing angles of the at least two doctors are needed to be taken into account. In this case, a target display subarea 05 corresponding to the set of viewing position parameters of each doctor may be obtained according to the set of viewing position parameters of the doctor, and the target display area 04 including the plurality of target display subareas 05 is determined according to the plurality of target display subareas 05, thereby causing the at least two doctors to simultaneously obtain better viewing effects.

In some other embodiments, in a case where the at least one set of viewing position parameters includes the plurality of sets of viewing position parameters, S101 include the following steps. A set of average viewing position parameters is firstly calculated according to the plurality of sets of viewing position parameters, and the target display area 04 is determined in the active area 03 of the display apparatus according to the set of average viewing position parameters.

Here, there is no limitation on how to determine the target display area 04 within the active area 03 of the display apparatus according to the set of average viewing position parameters. For example, the size of the target display area 04 is determined according to an average vertical distance included in the set of average viewing position parameters, and the position of the center of the target display area 04 is determined according to an average center, thereby determining the target display area 04.

There are a plurality of ways to calculate the average vertical distance. For example, an average value is calculated according to the vertical distances from the viewing positions to the plane where the active area 03 is located in the plurality of sets of viewing position parameters, and the average value is taken as the average vertical distance, thereby determining the size of the target display area 04.

There are a plurality of ways to determine the average center. For example, the plurality of target display subareas in one-to-one correspondence with the plurality of sets of viewing position parameters are firstly determined in the active area 03, and a center of each target display subarea is determined. The average center is then determined according to the centers of the target display subareas. When the centers of the target display subareas are on a same straight line, a line segment where the centers of the target display subareas are located is determined, and a midpoint of the line segment is determined to be the average center, i.e., the position of the center of the target display area 04. When the centers of the target display subareas are not on the same straight line, the centers of the target display subareas are sequentially connected. Connected line segments enclose a graph, and then a center of gravity of the graph is determined. The center of gravity is taken as the average center, i.e., the position of the center of the target display area 04.

In daily life, there may be cases where a plurality of viewers simultaneously views a same display apparatus 10. Some viewers are interested in images displayed by the display apparatus 10, but sometimes some viewers are not interested in the images displayed by the display apparatus 10. Although these viewers are in front of the display apparatus, the viewers' sight focuses are not on the display apparatus or the sight focuses significantly deviate from the center of the display apparatus. Thus, when the target display area 04 is obtained according to the plurality of sets of viewing position parameters, the obtained target display area 04 may not be an appropriate target display area 04 if sets of viewing position parameters of the viewers who are not interested in the displayed images are considered.

On this basis, in some embodiments, before the S100, the above display method further includes: obtaining a position of the sight focus of each viewer and determining a deviation value of the position of the sight focus of each viewer relative to the center of the active area; and comparing the deviation value with a set deviation threshold value; and if the deviation value is less than the set deviation threshold value, the step S100 is performed, and if the deviation value is greater than the set deviation threshold value, the set of viewing position parameters of the viewer is not obtained.

The position of the sight focus of each viewer is a position where the viewer's eyes watch. If the deviation value of the position of the sight focus of a viewer relative to the center of the active area is greater than the set deviation threshold value, the viewer may not be watching the display apparatus or may not be interested in the images displayed by the display apparatus, and there is no need to obtain the set of viewing position parameters of the viewer. Thus, when the target display area 04 is obtained according to the set of viewing position parameters of at least one viewer, it is equivalent to ignoring the set of viewing position parameters of this viewer and not considering influences of the set of viewing position parameters of this viewer on the target display area 04. If the deviation value of the position of the sight focus of a viewer relative to the center of the active area is less than the set deviation threshold value, the set of viewing position parameters of the viewer is obtained. In this case, when the target display area 04 is obtained, the influences of the set of viewing position parameters of the viewer on determining the target display area 04 need to be considered.

Here, the set deviation threshold value refers to an angle between a straight line passing through the human eyes and the center of the active area and a straight line passing through the human eyes and the position of the sight focus. A numerical size of the deviation threshold value is not limited, and may be set as needed. The smaller the set deviation threshold value is, the better the viewing effects the at least one viewer (referring to the at least one viewer, the deviation value of the position of the sight focus of whom relative to the center of the active area is less than the set deviation threshold value) obtains when the images are displayed in the obtained target display area 04. For example, the set deviation threshold value is set to be 20°, 30°, 40° and 50°.

There is no limitation on how to obtain the position of the sight focus of a viewer, as long as the position of the sight focus of the viewer may be obtained. For example, the position of the sight focus of the viewer is obtained through a pupil-corneal reflection vector method. That is, a human face is illuminated by using an infrared assisting light source to form a reflected image on a surface of a cornea of the eye, which is referred to as a Purkinje spot. When the human eyes stare at different positions, eyeballs will rotate accordingly. Assuming that the at least one viewer's head is not moving, since a position of an infrared light-emitting diode is fixed and the eyeballs are approximate spheres, when the eyeballs are moving, it may be considered that an absolute position of the Purkinje spot is constant, and positions of irises and pupils will change accordingly. Thus, relative positional relationships between the Purkinje spot and the pupils and the irises also changes. A determination of the relative positional relationships may be achieved by an image processing, and a direction of the sight may be obtained according to the relative positional relationships, thereby obtaining the position of the sight focus of the at least one viewer.

Figure 11:
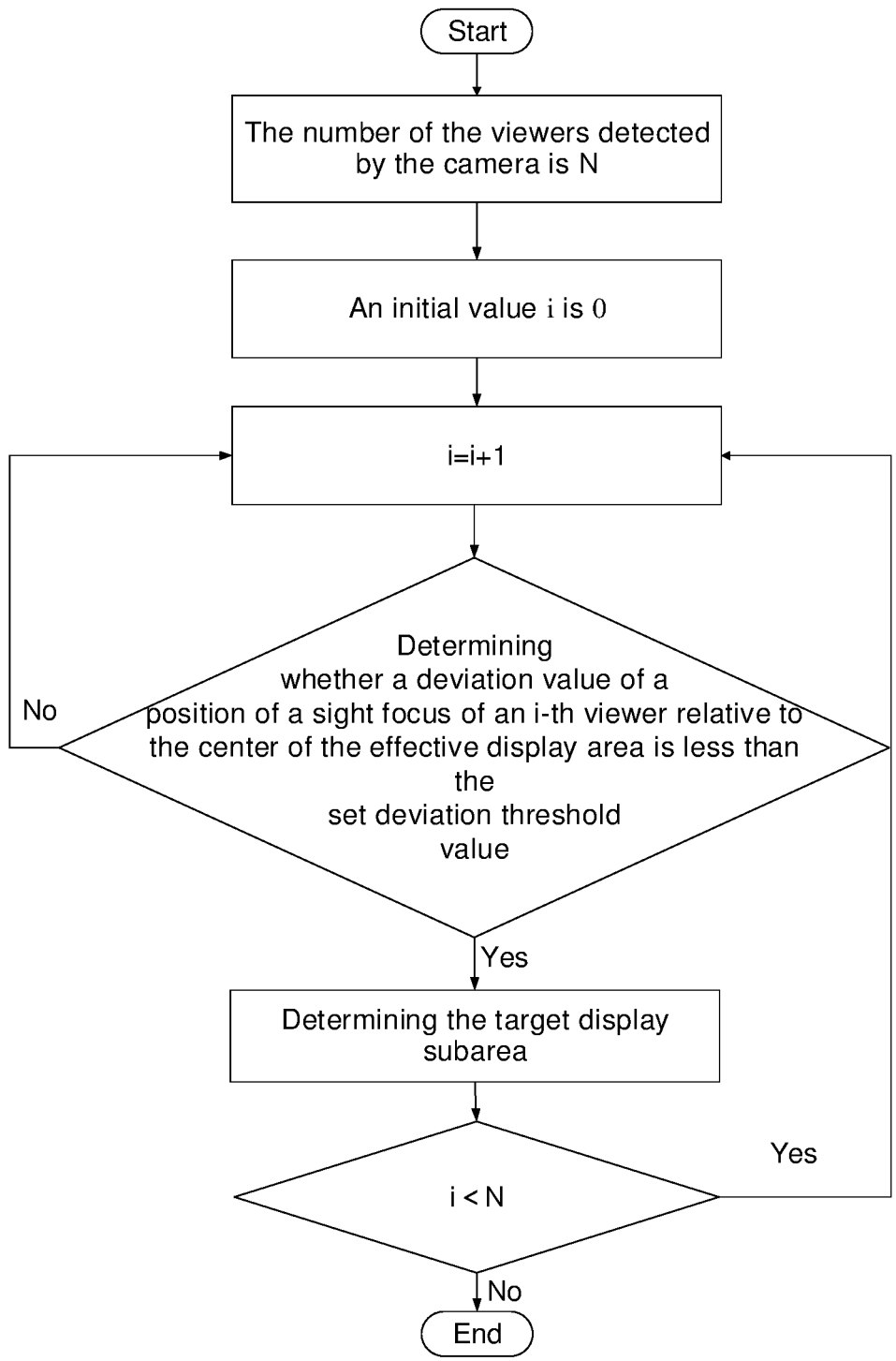
FIG. 11 is a flow diagram of yet another display method of a display apparatus, according to some embodiments of the present disclosure.

Referring to FIG. 11, taking detecting the set of viewing position parameters of the viewers by using the camera as an example, in this case, a single viewer corresponds to a single set of viewing position parameters. After the display apparatus 10 starts to work, the number of the viewers detected by using the camera is N. The number i of the viewers set in the display apparatus 10 is a variable, which takes values from one to N in order, and the initial value of i is zero.

When the first viewer is detected, the number i of the viewers is a sum of zero and one, that is, the number i of the viewers is one. It is determined whether a deviation value of a position of a sight focus of the first viewer relative to the center of the active area is less than the set deviation threshold value. If the deviation value is less than or equals to the set deviation threshold value, the set of viewing position parameters of the first viewer is obtained. If the deviation value is greater than the set deviation threshold value, the set of viewing position parameters of the first viewer is not obtained, and the second viewer is directly detected. The number i of the viewers in this case is a sum of one and one, that is, the number i of the viewers is two. And then, it is determined whether a deviation value of a position of a sight focus of the second viewer relative to the center of the active area is less than the set deviation threshold value. If the deviation value is less than or equals to the set deviation threshold value, the set of viewing position parameters of the second viewer is obtained. If the deviation value is greater than the set deviation threshold value, the set of viewing position parameters of the second viewer is not obtained, and the third viewer is directly detected. The number i of the viewers in this case is a sum of two and one, that is, the number i of the viewers is three. And then, it is determined whether a deviation value of a position of a sight focus of the third viewer relative to the center of the active area is less than the set deviation threshold value. The above process is repeated until the number i of the detected viewers is equal to the number N of the viewers detected by the camera.

In the above process of determining whether the deviation value of the position of the sight focus of each viewer relative to the center of the active area is less than the set deviation threshold value, if it is determined that the deviation value of the position of the sight focus of the viewer relative to the center of the active area is less than the set deviation threshold value, the set of viewing position parameters of the viewer is obtained, and the target display subarea corresponding to the set of viewing position parameters of the at least one viewer is determined to determine a more suitable target display area through the target display subarea.

In the above embodiments, before the at least set of viewing position parameters is obtained, a numerical relationship between the deviation value of the position of the sight focus of each viewer relative to the center of the display apparatus and the set deviation threshold value is determined to determine whether the viewer is interested in the images displayed by the display apparatus 10. If not, the set of viewing position parameters of the viewer is not obtained or ignored. Since the influences of the set of viewing position parameters of at least one viewer on the target display area 04 are not taken into consideration when the target display area 04 is obtained, the obtained target display area 04 is more accurate. This allows other viewers to have better viewing angles, thereby obtaining better viewing effects.

In some embodiments, the display apparatus 10 includes a backlight module, and the above display method further includes: controlling a portion of the backlight module corresponding to the target display area 04 to emit light.

Here, the description that controlling a portion of the backlight module corresponding to the target display area 04 to emit light refers to that only the portion of the backlight module corresponding to the target display area 04 emits light, and portions of the backlight module corresponding to other areas other than the target display area 04 in the active area 03 do not emit light.

Figure 12:
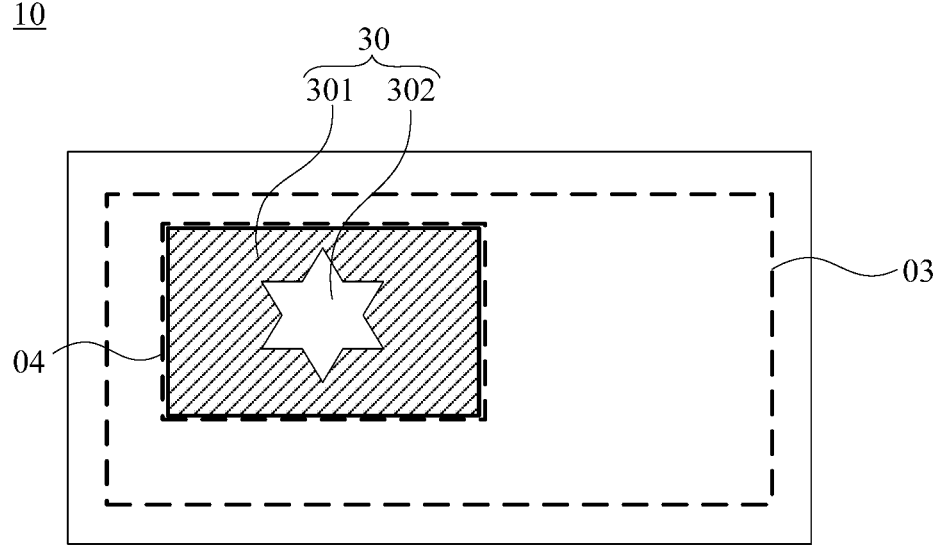
FIG. 12 is a schematic diagram of a target display area in which an image including a principal image and a background image are displayed, according to some embodiments of the present disclosure.

Referring to FIG. 12, the display apparatus 10 displays images in the target display area 04. Therefore, only the portion of the backlight module corresponding to the target display area 04 is controlled to emit light, and the portions of the backlight module corresponding to the areas other than the target display area 04 in the active area 03 do not emit light.

With this design, when images are displayed in the target display area 04 (i.e., at least a portion of the active area 03) of the display apparatus, an entire backlight module is not required to be in operation, that is, the entire backlight module is not required to emit light. Therefore, a phenomenon that portions of the backlight module corresponding to areas in which the images are not displayed emit light will not occur. This not only ensures a normal display in the target display area 04, but also saves power and achieves a purpose of reducing a power consumption of the display apparatus 10.

In some other embodiments, referring to FIG. 12, the display apparatus 10 includes the backlight module, and an image 30 displayed in the target display area 04 includes a principal image 302 and a background image 301. The above display method further includes: determining the principal image 302 in the image 30 displayed in the target display area 04, and controlling a portion of the backlight module corresponding to the principal image 302 to emit light.

There is no limitation on how to determine the principal image 302 in the image 30 displayed in the target display area 04. The principal image 302 may be determined according to a difference between gray scales of the principal image 302 and gray scales of the background image 301.

It will be noted that, when a content of the image displayed in the target display area 04 is relatively simple, the image may be divided into the principal image and the background image. The principal image refers to a content to be expressed in an entire image, and is an image area enclosed by a geometric shape such as a rectangle, a circle, or an ellipse. The background image refers to an image area in the image after removing the principal image. As shown in FIG. 12, in the image 30 displayed in the target display area 04, the image 302 is the principal image, and the image 301 is the background image.

When the image 30 displayed in the target display area 04 includes the principal image 302 and the background image 301, although the principal image 302 and the background image 301 are displayed in the target display area 04, since in the backlight module, only the portion corresponding to the principal image 302 emits light, and a portion corresponding to the background image 301 does not emit light, the at least one viewer may only see the principal image 302 and may not see the background image 301. Here, the portion of the backlight module that emits light may be determined according to parameters such as a size and a position of the principal image 302.

In a case where the image 30 displayed in the target display area 04 includes the principal image 302 and the background image 301, since the principal image 302 is the content to be conveyed by the entire image and is a portion that the at least one viewer is concerned with, only the portion of the backlight module corresponding to the principal image 302 is controlled to emit light. This not only ensures that the principal image 302 may be normally displayed, but also saves the power and reduces the power consumption of the display apparatus 10, because in the backlight module, the portions corresponding to the areas other than the target display area 04 in the active area 03 of the display apparatus 10 and the portion corresponding to the background image 301 do not emit light.

Some embodiments of the present disclosure provide a non-transitory computer-readable storage medium storing executable instructions that, when executed by a display apparatus, cause the display apparatus to perform the display method of the display apparatus described in any embodiment of the above embodiments.

The non-transitory computer-readable storage medium stores executable instructions for causing a device of the display apparatus (which may be a singlechip, a chip, etc.) or a processor of the display apparatus to perform all or part of the steps of the display method described in the embodiments of the present disclosure.

For example, the non-transitory computer-readable storage medium is a random access memory (RAM), a flash memory, a read only memory (ROM), an erasable programmable read only memory (EPROM), an electrically erasable programmable read only memory (EEPROM), a register, a hard disk, a removable hard disk, a compact disk read only memory (CD-ROM) or any other form of storage medium known in the art.

Figure 13:
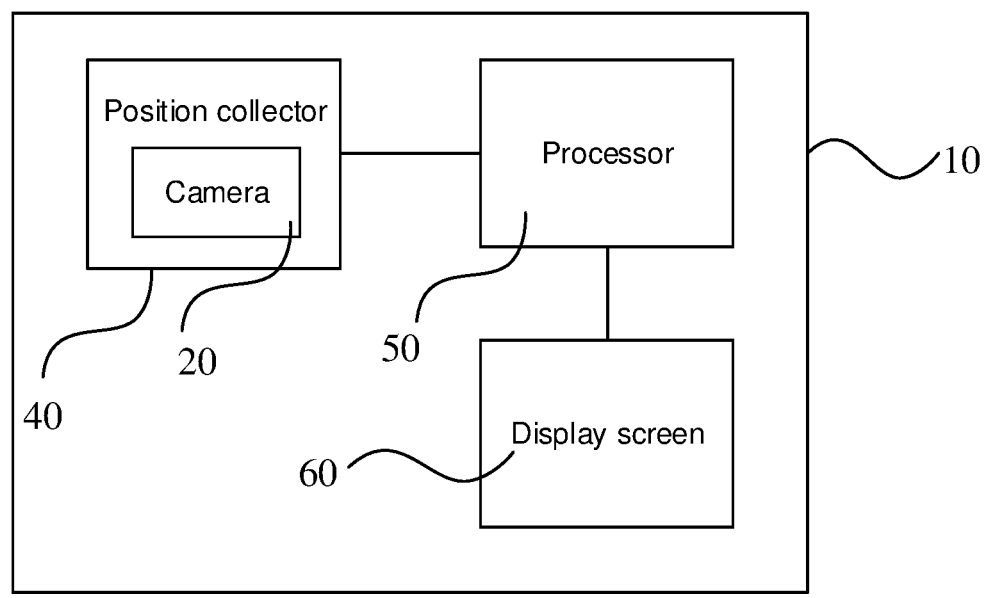
FIG. 13 is a schematic diagram showing a structure of a display apparatus, according to some embodiments of the present disclosure.

Referring to FIG. 13, some embodiments of the present disclosure provide a display apparatus 10. The display apparatus 10 includes a position collector 40, a processor 50 coupled to the position collector 40, and a display screen 60 coupled to the processor 50. The position collector 40 and the processor 50 are configured to obtain at least one set of viewing position parameters. The processor 50 is further configured to determine the target display area 04 within the active area 03 of the display apparatus 10 according to the at least one set of viewing position parameters. The display screen 60 is configured to display images in the target display area 04.

It will be noted that, the display apparatus 10 may be a liquid crystal display, an organic light-emitting diode display, or other types of display apparatuses, which is not limited here. For example, the display apparatus 10 is any apparatus having a display function such as a television, a computer, a digital photo frame, a mobile phone, or a tablet PC.

A type of the position collector 40 is not limited, as long as it may help to obtain the at least one set of viewing position parameters of the at least one viewer. For example, the position collector 40 is a camera, a position sensor 20, etc. Here, the position collector 40 may be used to collect a position of any part of each viewer's body as the viewing position to obtain the at least one set of viewing position parameters. For example, the position of the at least one viewer's eye is collected as the viewing position to obtain at least one set of viewing position parameters, or the position of the at least one viewer's head is collected as the viewing position to obtain at least one set of viewing position parameters.

A type of the processor 50 is not limited. For example, the processor 50 may be a central processing unit (CPU), a graphics processing unit (GPU), a microcontroller unit (MCU), etc. In addition, a connection type between the processor 50 and the position collector 40 and a connection type between the display screen 60 and the processor 50 are not limited, as long as signal transmissions may be achieved among the processor 50, the position collector 40, and the display screen 60. For example, the above connection type is a wired or a wireless connection.

The position collector 40 and the processor 50 in the display apparatus may obtain the at least one set of viewing position parameters. The processor 50 may determine the target display area 04 within the active area 03 of the display screen 60 according to the at least one set of viewing position parameters. Since the target display area 04 of the display screen 60, that is, a display area having better display effects, is determined according to the at least one set of viewing position parameters of the at least one viewer, and the images are displayed in the target display area 04 of the display screen 60, the at least one viewer may be in a better viewing angle when viewing the images, so that the at least one viewer may obtain better viewing effects.

In addition, since the size and position of the target display area 04 (i.e., the displayed image) may correspondingly vary with the change of the set of viewing position parameters of the at least one viewer, the at least one viewer may be in a better viewing angle at any position of the effective viewing area of the display apparatus 10, thereby improving the experiences of the users.

Herein, there is no limitation on how the processor 50 determines the target display area 04 in the active area 03 of the display apparatus 10 according to the at least one set of viewing position parameters. For example, each set of viewing position parameters includes the vertical distance from the viewing position to the plane where the active area is located, and deviation information that the viewing position deviates from the center axis of the active area 03. The processor 50 is configured to determine the size of the target display area 04 according to the vertical distance from the viewing position to the plane where the active area is located, and determine the position of the center of the target display area 04 according to the deviation information that the viewing position deviates from the central axis of the active area 03.

The target display area 04 may be obtained according to the size and the position of the center of the target display area 04.

In some embodiments, a plurality of sets of viewing position parameters are obtained. In some examples, the processor 50 is configured to determine the set of average viewing position parameters according to the plurality of sets of viewing position parameters and determine the target display area 04 in the active area 03 of the display apparatus 10 according to the set of average viewing position parameters. In some other examples, the processor 50 is configured to determine a target display subarea 05 in the active area 03 of the display apparatus 10 according to each set of viewing position parameters and determine the target display area 04 according to the plurality of target display subareas 05.

In the case where a plurality of sets of viewing position parameters are obtained, and the plurality of viewers collectively view one display apparatus 10, since the plurality of sets of viewing position parameters are different, the target display subareas 05 corresponding to the plurality of sets of viewing position parameters are different.

For example, as shown in FIG. 8, a target display subarea 05 determined according to a set of viewing position parameters 1 is H, a target display subarea 05 determined according to a set of viewing position parameters 2 is I, and a target display subarea 05 determined according to a set of viewing position parameters 3 is J. Here, since each set of viewing position parameters corresponds to one target display subarea 05, the number of sets of viewing position parameters is the same as the number of the target display subareas 05.

On this basis, there is no limitation on how the processor 50 determines the target display area 04 according to the plurality of target display subareas 05. Illustrative descriptions are provided below.

For example, as shown in FIG. 8, the processor 50 obtains the minimum graphic area including the plurality of target display subareas 05. The minimum graphic area is taken as the target display area 04. The minimum graphic area has a preset shape, such as a rectangle, a circle, an ellipse or a heart shape.

For example, the shape of the active area 03 is a rectangle, and the preset shape of the minimum graphic area is also a rectangle. The two sets of opposite sides of the minimum graphic area may or may not be parallel to the two sets of opposite sides of the active area 03 respectively. As shown in FIG. 8, the two sets of opposite sides of the minimum graphic area are respectively parallel to the two sets of opposite sides of the active area 03.

Since the target display area 04 includes the plurality of target display subareas 05, the plurality of viewers corresponding to the plurality of sets of viewing position parameters are in better viewing angles when the images are displayed in the target display area 04, and thus the plurality of viewers may obtain better viewing effects.

For example, the processor 50 is configured to determine at least one primary viewer among the plurality of viewers and determine a center of a first target display subarea corresponding to a set of viewing position parameters of the at least one primary viewer. And then the first target display subarea is proportionally enlarged to include the plurality of target display subareas 05 centering on the center of the first target display subarea to obtain the first undetermined area. The first target display subarea is proportionally enlarged to be in contact with the boundary of the active area 03 centering on the center of the first target display subarea to obtain the second undetermined area. Finally, it is determined whether the first undetermined area extends beyond the second undetermined area. As shown in FIG. 9A, in the case where the first undetermined area does not extend beyond the second undetermined area, the first undetermined area is taken as the target display area 04. As shown in FIG. 9B, in the case where the first undetermined area extend beyond the second undetermined area, the second undetermined area is taken as the target display area 04.

As shown in FIG. 9A, the target display subarea K is the target display subarea 05 determined according to the primary set of viewing position parameters, i.e., the first target display subarea. The target display subareas L and M are the target display subareas 05 determined according to the secondary sets of viewing position parameters. As shown in FIG. 9B, the target display subarea U is the first target display subarea. The target display subareas Q and R are the target display subareas 05 determined according to the secondary sets of viewing position parameters.

Here, the plurality of viewers include the at least one primary viewer and the at least one secondary viewer. There is no limitation on how the processor 50 determines the at least one primary viewer in the plurality of viewers. For example, each of the at least one primary viewer wears the signal projector, and the at least one primary viewer may be determined according to the received signals transmitted by the signal projector. For another example, a viewer in the plurality of viewers, a distance from whom to the display apparatus 10 is the smallest, may be determined according to the set of viewing position parameters of each viewer, and this viewer is taken as the primary viewer.

In the above embodiments, since the processor 50 obtains the target display area 04 through the proportional enlargement centering on the center of the target display subarea 05 determined according to the primary set of viewing position parameters of the at least one primary viewer, the center of the target display area 04 coincides with the center of the target display subarea 05 determined according to the primary set of viewing position parameters of the at least one primary viewer. Thus, when a primary viewer views the images displayed in the target display area 04, the viewing angle of the primary viewer is better, so that the primary viewer may obtain better viewing effects.

In some embodiments, the position collector 40 and the processor 50 are configured to obtain the position of the sight focus of each viewer. The processor 50 is further configured to determine the deviation value of the position of the sight focus of each viewer relative to the center of the active area. The processor 50 is further configured to compare the deviation value with the set deviation threshold value, and to obtain the primary set of viewing position parameters of the viewer if the deviation value is less than the set deviation threshold value.

The position of the sight focus of each viewer is the position where the viewer's eyes watch. If the deviation value of the position of the sight focus of a viewer relative to the center of the active area is greater than the set deviation threshold value, the viewer may not be watching the display apparatus or may not be interested in the images displayed by the display apparatus, and there is no need to obtain the set of viewing position parameters of the viewer. Thus, when the target display area 04 is obtained according to the set of viewing position parameters of at least one viewer, it is equivalent to ignoring the set of viewing position parameters of this viewer and not considering the influences of the set of viewing position parameters of this viewer on the target display area 04. If the deviation value of the position of the sight focus of a viewer relative to the center of the active area is less than the set deviation threshold value, the set of viewing position parameters of the viewer is obtained. In this case, when the target display area 04 is obtained, the influences of the set of viewing position parameters of the viewer on the target display area 04 need to be considered.

Here, the set deviation threshold value refers to the angle between the straight line passing through the human eyes and the center of the active area and the straight line passing through the human eyes and the position of the sight focus.

The numerical size of the deviation threshold value is not limited, and may be set as needed. The smaller the set deviation threshold value is, the better the viewing effects the at least one viewer (referring to the at least one viewer, the deviation value of the position of the sight focus of whom relative to the center of the active area is less than the set deviation threshold value) obtains when the images are displayed in the obtained target display area 04. For example, the set deviation threshold value is set to be 20°, 30°, 40° or 50°.

On this basis, there is no limitation on how to obtain the position of the sight focus of each viewer, which may be the same as the above display method. Details are not described herein again.

In some embodiments, before the position collector 40 and the processor 50 obtain the set of viewing position parameters of the viewer, the position collector 40 and the processor 50 firstly determine the numerical relationship between the deviation value of the position of the sight focus of the viewer relative to the center of the display apparatus and the set deviation threshold value to determine whether the viewer is interested in the images displayed by the display apparatus 10. If not, the set of viewing position parameters of the viewer is not obtained or ignored. Since the influences of the set of viewing position parameters of the viewer on the target display area 04 is not taken into consideration when the target display area 04 is obtained, the obtained target display area 04 is more accurate. This allows other viewers to have better viewing angles, thereby obtaining better viewing effects.

For example, referring to FIG. 13, the position collector 40 includes the camera 20. The camera is configured to shoot the effective viewing area to obtain an image of the effective viewing area. The processor 50 is configured to directly determine the position of the sight focus of each viewer according to information of the effective viewing area 01, such as a picture or a moving image, and determine the deviation value of the position of the sight focus of the viewer relative to the center of the active area. The processor is further configured to compare the deviation value with the set deviation threshold value, and to obtain a set of viewing position parameters of the viewer in a case where the deviation value is less than or equal to the set deviation threshold value.

Figure 14:
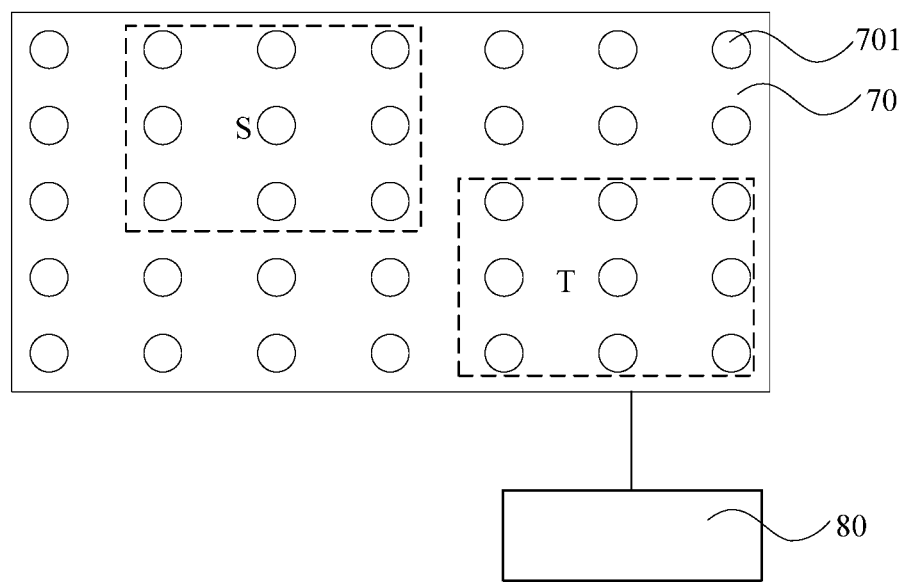
FIG. 14 is a schematic diagram showing a structure of a backlight module including a plurality of light-emitting components, according to some embodiments of the present disclosure.

In some embodiments, referring to FIGS. 13 and 14, the display apparatus provided by some embodiments of the present disclosure is a liquid crystal display including the backlight module 70 and a backlight controller 80. The backlight controller 80 is disposed on a side of the display screen away from a display surface side, and the backlight module 70 includes a plurality of light-emitting components 701 disposed on a plane parallel to a display surface of the display screen 60. The backlight controller 80 is coupled to the backlight module 70 and the processor 50. The backlight module 80 is configured to control light-emitting components 701 corresponding to at least a portion of the target display area in the plurality of light-emitting components 701 under control of the processor 50.

For example, the backlight controller 80 is configured to control the portion of the backlight module 70 corresponding to the target display area 04 to emit light under the control of the processor 50. For another example, in the case where the image displayed in the target display area 04 includes the principal image 302 and the background image 301, the backlight controller 80 is configured to control the portion of the backlight module 70 corresponding to the principal image 302 to emit light.

The backlight controller 80 described in the above embodiments is executed, for example, by a microprocessor programmed to perform one or more of the operations and/or functions described herein. Alternatively, the backlight controller 80 is implemented in whole or in part by specially configured hardware (e.g., by one or more application-specific integrated circuits (ASIC(s))).

Herein, in order to enable the backlight controller 80 to control the portion of the backlight module 70 corresponding to the target display area 04 or the portion of the backlight module 70 corresponding to the principal image 302, the backlight module 70 includes the plurality of light-emitting components 701, and the backlight controller 80 may individually control each of the light-emitting components 701.

It will be noted that, in the case where the image 30 displayed in the target display area 04 includes the principal image 302 and the background image 301, although the principal image 302 and the background image 301 are displayed in the target display area 04, since in the backlight module 70, only the portion corresponding to the principal image 302 emits light, and the portion corresponding to the background image 301 does not emit light, the at least one viewer may only see the principal image 302 and may not see the background image 301.

Since the images are displayed in the target display area 04, only the portion of the backlight module corresponding to the target display area 04 is controlled to emit light, and the portions of the backlight module 70 corresponding to the areas other than the target display area 04 in the active area 03 do not emit light. This not only ensures the normal display in the target display area 04, but also saves power and achieves the purpose of reducing the power consumption of the display apparatus 10.

On this basis, in the case where the image 30 displayed in the target display area 04 includes the principal image 302 and the background image 301, since the principal image 302 is the content to be conveyed by the entire image and is the portion that the at least one viewer is concerned with, only the portion of the backlight module corresponding to the principal image 302 is controlled to emit light. This not only ensures that the principal image 302 may be normally displayed, but also saves the power and reduces the power consumption of the display apparatus 10, because in the backlight module, the portions corresponding to the areas other than the target display area 04 in the active area 03 of the display apparatus 10 and the portion corresponding to the background image 301 do not emit light.

In some embodiments, as shown in FIG. 14, the backlight module 70 includes the plurality of light-emitting components 701, and the backlight controller 80 is configured to control each light-emitting component 701 to be turned on and turned off.

For example, a single light-emitting component 701 is a single point light source, and each light-emitting component 701 is a light-emitting diode (LED) or a halogen lamp.

The number of the light-emitting components 701 included in the backlight module 70 is not limited, and the number of the light-emitting components 701 may be determined according to a size of the backlight module 70 and an arrangement density of the light-emitting components 701.

Further, a plurality of point light source light-emitting components 701 may be coupled in parallel with each other.

Since the backlight controller 80 may control each light-emitting component 701 to be turned on and turned off, that is, a dot matrix control method is used, the backlight controller 80 may control any area of the backlight module 70 to emit light, that is, an area in the backlight module 70 that emits light may be at any position and may have any shape. For example, as shown in FIG. 14, an area S in the backlight module 70 may be controlled to emit light, and an area T in the backlight module 70 may also be controlled to emit light. In addition, referring to FIG. 14, the area S or the area T in the backlight module 70 may correspond to the target display area 04 or correspond to the principal image 302 in the image 30 displayed in the target display area 04.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A display method of a display apparatus, comprising:
    obtaining at least one set of viewing position parameters, wherein the at least one set of viewing position parameters includes a plurality of sets of viewing position parameters;
    determining a plurality of target display subareas in one-to-one correspondence with the plurality of sets of viewing position parameters in the active area according to the plurality of sets of viewing position parameters;
    determining a target display area according to the plurality of target display subareas, wherein the target display area is a minimum graphic area including the plurality of target display subareas, and the minimum graphic area has a preset shape; and
    displaying images in the target display area.

2. The display method according to claim 1, wherein determining the target display area according to the plurality of target display subareas, includes:
    determining a primary set of viewing position parameters in the plurality of sets of viewing position parameters;
    searching a target display subarea corresponding to the primary set of viewing position parameters as a first target display subarea, and determining a center of the first target display subarea;
    proportionally enlarging the first target display subarea to include the plurality of target display subareas centering on the center of the first target display subarea, and taking an enlarged first target display subarea as a first undetermined area;
    proportionally enlarging the first target display subarea to be in contact with a boundary of the active area centering on the center of the first target display subarea, and taking an enlarged first target display subarea as a second undetermined area; and
    determining whether the first undetermined area extends beyond the second undetermined area; if yes, taking the second undetermined area as the target display area; and if not, taking the first undetermined area as the target display area.

3. The display method according to claim 2, wherein determining the primary set of viewing position parameters in the plurality of sets of viewing position parameters, includes:
    determining the primary set of viewing position parameters according to received signals transmitted by at least one signal projector, wherein each viewer corresponding to the primary set of viewing position parameters wears a signal projector.

4. The display method according to claim 2, wherein determining the primary set of viewing position parameters in the plurality of sets of viewing position parameters, includes:
    determining a viewing position having a smallest vertical distance from the plane where the active area is located from viewing positions corresponding to the plurality of sets of viewing position parameters, and taking a set of viewing position parameters corresponding to the determined viewing position as the primary set of viewing position parameters.

5. The display method according to claim 2, wherein determining the primary set of viewing position parameters in the plurality of sets of viewing position parameters, includes:
    calculating a vertical distance value from each viewing position in viewing positions corresponding to the plurality of sets of viewing position parameters to a central axis of the active area according to the plurality of sets of viewing position parameters;
    selecting viewing positions, the vertical distance values from which to the central axis of the active area are less than or equal to a preset vertical distance threshold value from the viewing positions corresponding to the plurality of sets of viewing position parameters; and
    determining a viewing position having a smallest vertical distance from the plane where the active area is located from selected viewing positions and taking a set of viewing position parameters corresponding to the determined viewing position as the primary set of viewing position parameters.

6. The display method according to claim 1, wherein before obtaining the at least one set of viewing position parameters, the display method further comprises:
    obtaining a position of a sight focus of each viewer and determining a deviation value of the position of the sight focus of the viewer relative to a center of the active area; and
    comparing the deviation value corresponding to the viewer with a set deviation threshold value; and if the deviation value is less than or equal to the set deviation threshold value, obtaining a set of viewing position parameters of the viewer.

7. The display method according to claim 1, wherein the display apparatus includes a backlight module, and the display method further comprises:
    controlling a portion of the backlight module corresponding to the target display area to emit light.

8. The display method according to claim 1, wherein the display apparatus includes a backlight module, and the display method further comprises:
    determining a principal image and a background image in an image displayed in the target display area; and
    controlling a portion of the backlight module corresponding to the principal image to emit light.

9. A display apparatus for performing a display method according to claim 1, comprising a position collector, a processor coupled to the position collector, and a display screen coupled to the processor, wherein
    the position collector and the processor are configured to obtain at least one set of viewing position parameters, wherein the at least one set of viewing position parameters includes a plurality of sets of viewing position parameters;

the processor is further configured to determine a plurality of target display subareas in one-to-one correspondence with the plurality of sets of viewing position parameters in the active area according to the plurality of sets of viewing position parameters and a target display area according to the plurality of target display subareas, wherein the target display area is a minimum graphic area including the plurality of target display subareas, and the minimum graphic area has a preset shape; and the display screen is configured to display images in the target display area.

10. The display apparatus according to claim 9, wherein the position controller includes a camera configured to shoot an effective viewing area to obtain information of the effective viewing area.

11. The display apparatus according to claim 10, wherein the processor is further configured to:
obtain a position of a sight focus of at least one viewer according to the information of the effective viewing area, and determine a deviation value of the position of the sight focus of the at least one viewer relative to a center of the active area;
compare the deviation value corresponding to the at least one viewer with a deviation threshold value respectively; and
obtain a set of viewing position parameters of a corresponding viewer if the deviation value is less than or equal to the set deviation threshold value.

12. The display apparatus according to claim 9, wherein the position controller includes a position sensor, wherein
the position includes an infrared transmitter configured to emit infrared light to an effective viewing area, and an infrared receiver configured to receive infrared light reflected back by at least one viewer in an effective viewing area.

13. The display apparatus according to claim 9, further comprising:
a backlight module disposed on a side of the display screen opposite to a display surface side, wherein the backlight module includes a plurality of light-emitting components, and the plurality of the light-emitting components are disposed on a plane parallel to a display surface of the display screen; and
a backlight controller coupled to the backlight module and the processor and configured to control light-emitting components corresponding to at least a portion of the target display area in the plurality of light-emitting components under control of the processor.

14. A non-transitory computer-readable storage medium storing executable instructions that, when executed by a display apparatus, cause the display apparatus to perform the display method of the display apparatus according to claim 1.

15. A display method of a display apparatus, comprising:
obtaining at least one set of viewing position parameters, wherein
the at least one set of viewing position parameters includes one set of viewing position parameters, and the set of viewing position parameters includes: a vertical distance from a viewing position to a plane where the active area is located, and deviation information that the viewing position deviates from a central axis of the active area;
the deviation information includes an angle between the central axis and a straight line passing through the viewing position and a center of the active area, and a direction in which the viewing position deviates from the central axis, wherein the central axis is a straight line that passes through the center of the active area and is vertical to the plane where the active area is located;
determining a size of the target display area according to the vertical distance from the viewing position to the plane where the active area is located;
determining a position of a center of the target display area according to the deviation information that the viewing position deviates from the central axis of the active area; and
displaying images in the target display area.

16. A display apparatus for performing a display method according to claim 15, comprising a position collector, a processor coupled to the position collector, and a display screen coupled to the processor, wherein
the position collector and the processor are configured to obtain at least one set of viewing position parameters, wherein the at least one set of viewing position parameters includes one set of viewing position parameters, and the set of viewing position parameters includes: a vertical distance from a viewing position to a plane where the active area is located, and deviation information that the viewing position deviates from a central axis of the active area;
wherein the deviation information includes an angle between the central axis and a straight line passing through the viewing position and a center of the active area, and a direction in which the viewing position deviates from the central axis, wherein the central axis is a straight line that passes through the center of the active area and is vertical to the plane where the active area is located;
the processor is further configured to determine a size of the target display area according to the vertical distance from the viewing position to the plane where the active area is located and a position of a center of the target display area according to the deviation information that the viewing position deviates from the central axis of the active area;
the display screen is configured to display images in the target display area.

* * * * *